(12) United States Patent
Cao et al.

(10) Patent No.: US 9,141,882 B1
(45) Date of Patent: Sep. 22, 2015

(54) CLUSTERING OF TEXT UNITS USING DIMENSIONALITY REDUCTION OF MULTI-DIMENSIONAL ARRAYS

(71) Applicant: Networked Insights, LLC, Madison, WI (US)

(72) Inventors: Baoqiang Cao, Austin, TX (US); T. Ryan Fitz-Gibbon, Fitchburg, WI (US); Lucas Forehand, McFarlen, WI (US); Ryan McHale, Chicago, IL (US); Bradley Burke, Naperville, IL (US)

(73) Assignee: NETWORKED INSIGHTS, LLC, Madison, WI (US)

( * ) Notice: Subject to any disclaimer, the term of this patent is extended or adjusted under 35 U.S.C. 154(b) by 193 days.

(21) Appl. No.: 13/656,315

(22) Filed: Oct. 19, 2012

(51) Int. Cl.
| | |
|---|---|
| G06E 1/00 | (2006.01) |
| G06E 3/00 | (2006.01) |
| G06F 15/18 | (2006.01) |
| G06G 7/00 | (2006.01) |
| G06K 9/62 | (2006.01) |
| G06F 17/30 | (2006.01) |

(52) U.S. Cl.
CPC .......... *G06K 9/6251* (2013.01); *G06F 17/3071* (2013.01); *G06F 17/30601* (2013.01); *G06F 17/30705* (2013.01); *G06F 17/30713* (2013.01)

(58) Field of Classification Search
CPC .................... G06F 17/30601; G06F 17/30705; G06F 17/3071; G06F 17/30713; G06K 9/6251
See application file for complete search history.

(56) References Cited

U.S. PATENT DOCUMENTS

| | | |
|---|---|---|
| 6,075,530 A | 6/2000 | Lucas et al. |
| 6,092,072 A | 7/2000 | Guha et al. |
| 6,216,134 B1 | 4/2001 | Heckerman et al. |
| 6,704,729 B1 | 3/2004 | Klein et al. |
| 6,742,003 B2 | 5/2004 | Heckerman et al. |
| 6,895,397 B2 | 5/2005 | Nagamura et al. |
| 7,080,063 B2 | 7/2006 | Campos et al. |
| 7,174,336 B2 | 2/2007 | Campos et al. |
| 7,246,128 B2 | 7/2007 | Jordahl |
| 7,271,804 B2 | 9/2007 | Evans |
| 7,333,998 B2 | 2/2008 | Heckerman et al. |
| 7,356,777 B2 | 4/2008 | Borchardt et al. |
| 7,363,311 B2 | 4/2008 | Fujita et al. |
| 7,404,151 B2 | 7/2008 | Borchardt et al. |
| 7,451,124 B2 | 11/2008 | Handley |
| 7,590,642 B2 | 9/2009 | Campos et al. |
| 7,609,267 B2 | 10/2009 | Evans |

(Continued)

OTHER PUBLICATIONS

Globerson et al.; "Sufficient Dimensionality Reduction"; Mar. 2003; <http://jmlr.org/papers/volume3/globerson03a/globerson03a.pdf>.*

(Continued)

*Primary Examiner* — Neveen Abel Jalil
*Assistant Examiner* — Michael K Tamaru
(74) *Attorney, Agent, or Firm* — Foley & Lardner LLP

(57) ABSTRACT

Methods, systems, and apparatuses, including computer programs encoded on computer-readable media, for tokenizing n-grams from a plurality of text units. A multi-dimensional array is created having a plurality of dimensions based upon the plurality of text units and the n-grams from the plurality of text units. The multi-dimensional array is normalized and the dimensionality of the multi-dimensional array is reduced. The reduced dimensionality multi-dimensional array is clustered to generate a plurality of clusters that each cluster includes one or more of the plurality of text units.

20 Claims, 8 Drawing Sheets

(56) References Cited

U.S. PATENT DOCUMENTS

| | | |
|---|---|---|
| 7,769,752 B1 | 8/2010 | Tumer et al. |
| 7,870,134 B2 | 1/2011 | Brueckner |
| 7,885,957 B2 | 2/2011 | Evans |
| 2003/0018652 A1 | 1/2003 | Heckerman et al. |
| 2003/0093432 A1* | 5/2003 | Fujita et al. ............ 707/100 |
| 2003/0212519 A1 | 11/2003 | Campos et al. |
| 2003/0212520 A1 | 11/2003 | Campos et al. |
| 2003/0212693 A1 | 11/2003 | Campos et al. |
| 2003/0212713 A1 | 11/2003 | Campos et al. |
| 2004/0139105 A1 | 7/2004 | Trepess et al. |
| 2004/0153456 A1 | 8/2004 | Charnock et al. |
| 2004/0172600 A1 | 9/2004 | Evans |
| 2004/0181554 A1 | 9/2004 | Heckerman et al. |
| 2005/0086253 A1 | 4/2005 | Brueckner |
| 2005/0144158 A1 | 6/2005 | Capper et al. |
| 2006/0164409 A1 | 7/2006 | Borchardt et al. |
| 2006/0184500 A1* | 8/2006 | Najork et al. ............... 707/1 |
| 2006/0259481 A1 | 11/2006 | Handley |
| 2007/0109297 A1* | 5/2007 | Borchardt et al. ........ 345/419 |
| 2007/0185910 A1* | 8/2007 | Koike et al. ............ 707/104.1 |
| 2008/0007556 A1 | 1/2008 | Evans |
| 2009/0037390 A1 | 2/2009 | Handley |
| 2009/0327259 A1 | 12/2009 | Smith |
| 2010/0049708 A1* | 2/2010 | Kawai et al. ................ 707/5 |
| 2010/0070497 A1 | 3/2010 | Duplessis et al. |
| 2010/0205128 A1 | 8/2010 | Nolan et al. |
| 2010/0313157 A1 | 12/2010 | Carlsson et al. |
| 2011/0029527 A1 | 2/2011 | Knight et al. |
| 2011/0055210 A1 | 3/2011 | Meredith et al. |
| 2011/0107271 A1 | 5/2011 | Borchardt et al. |
| 2011/0208741 A1 | 8/2011 | Brueckner |

OTHER PUBLICATIONS

Kogan, Jacob et al.; Grouping Multidimensional Data; Springer Berlin Heidelberg; p. 89.*
Hinton, Geoffrey, et al., Stochastic Neighbor Embedding, University of Toronto, Canada, 8 pgs. *Advances in neural information processing systems* 15 (2002): 833-840.
Finkel, Jenny, et al., Incorporating Non-local Information into Information Extraction Systems by Gibbs Sampling, Stanford University, U.S.A., ACL '05 Proceedings of the 43rd Annual Meeting on Association for Computational Linguistics pp. 363-370.
Ester, Martin, et al., A Density-Based Algorithm for Discovering Clusters in Large Spatial Databases with Noise, Proceedings of $2^{nd}$ International Conference on Knowledge Discovery and Data Mining (KDD-1996), Germany, 6 pgs.
van der Maaten, Laurens, et al., Visualizing Data using t-SNE, Journal of Machine Learning Research 1 (2008) 1-48, pp. 1-25.
Bunte, Kerstin, et al., Stochastic Neighbor Embedding (SNE) for Dimension Reduction and Visualization using arbitrary Divergences, Neurocomputing, Dec. 13, 2011, 40 pgs.
Blei, David, et al., Latent Dirichlet Allocation, Journal of Machine Learning Research 3 (2003) 993-1002, 30 pgs.
Tomokiyo, Takashi, et al., A Language Model Approach to Keyphrase Extraction, Published in MWE '03 Proceedings of the ACL 2003 workshop on Multiword expressions: analysis, acquisition and treatment—vol. 18, U.S.A., 8 pgs.

* cited by examiner

CLUSTERING OF TEXT UNITS USING DIMENSIONALITY REDUCTION OF MULTI-DIMENSIONAL ARRAYS

BACKGROUND

User-generated content has exploded on the internet due in part to the ease of producing and distributing the user-generated content. For example, websites allow users to publish blog or mico-blog entries to hundreds if not hundreds of thousands of users. In addition to the ease of distribution, the cost for the user generating the content is minimal. Users can publish blog entries for free. The cost of distribution along with the cheap cost of distribution has lead to an incredibly large amount of user-generated content. With the large amount of user-generated content being easily available over the internet, tools are needed to analyze this data.

BRIEF SUMMARY

In general, one aspect of the subject matter described in this specification can be embodied in methods for tokenizing n-grams from a plurality of text units. A multi-dimensional array is created having a plurality of dimensions based upon the plurality of text units and the n-grams from the plurality of text units. The multi-dimensional array is normalized and the dimensionality of the multi-dimensional array is reduced. The reduced dimensionality multi-dimensional array is clustered to generate a plurality of clusters that each cluster includes one or more of the plurality of text units. Other implementations of this aspect include corresponding systems, apparatuses, and computer-readable media configured to perform the actions of the method.

The foregoing summary is illustrative only and is not intended to be in any way limiting. In addition to the illustrative aspects, implementations, and features described above, further aspects, implementations, and features will become apparent by reference to the following drawings and the detailed description.

BRIEF DESCRIPTION OF THE FIGURES

The foregoing and other objects, aspects, features, and advantages of the disclosure will become more apparent and better understood by referring to the following description taken in conjunction with the accompanying drawings, in which.

Figure 1:
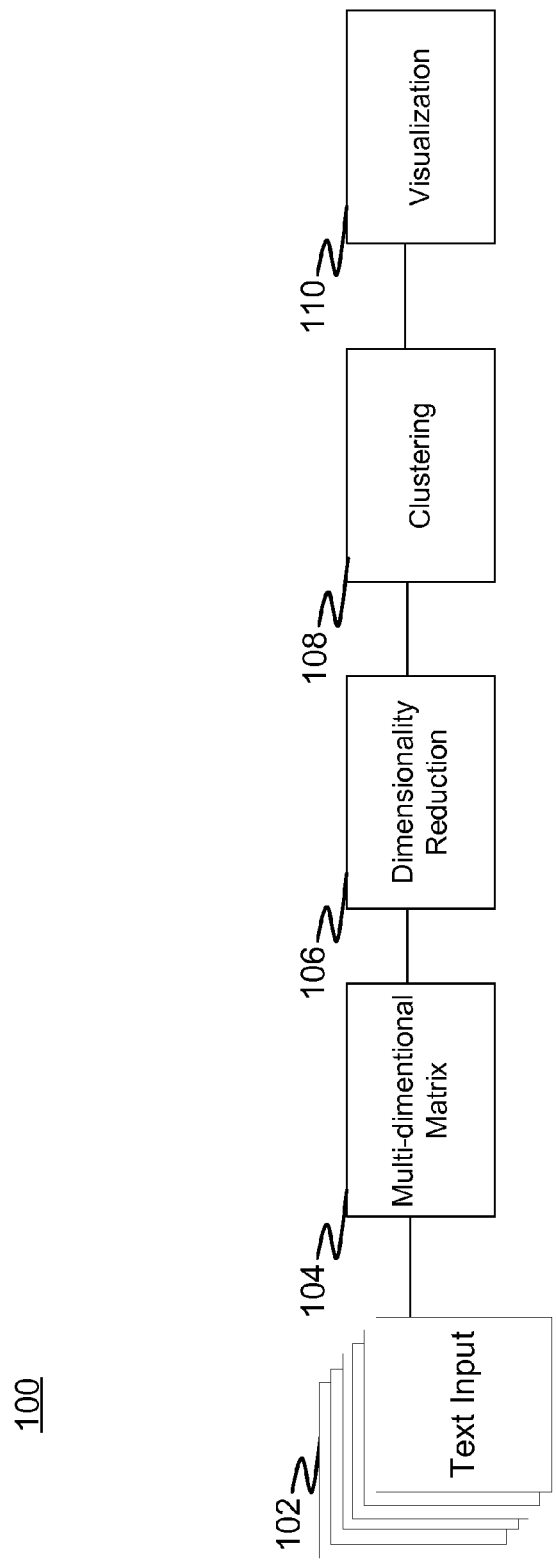
FIG. 1 is a block diagram of a system for visualizing clusters of concepts within text data in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Large amounts of text data, especially unstructured text data, can be generated from various sources. For example, user-generated content available on the internet such as micro-blog entries, blog entries, product reviews, comments, public social media posts, web pages, etc., is readily available as text data, usually unstructured. Unstructured text data means the text is free-flowing text without significant limitations. For example, a blog entry is generally unstructured. There can be an indication of a publication date and/or author, but the content of the blog post is free-flowing text that does not adhere to a particular format. Other examples of text data are generated but not publically available over any network. For example, call center logs, internal documents, emails, instant messages, text messages, private social media posts, etc., are all text data. Regardless of how accessible the text data is, tools that analyze and provide insight into the text data are valuable. As another example, text data can be derived from a larger set of text data. For example, relevant text data can be identified based upon search terms, a time associated with the text data, a domain associated with the text data, or the language of the text. The relevant text data can then be used as the text data.

FIG. 1 is a block diagram of a system 100 for visualizing clusters of concepts within text data in accordance with an illustrative embodiment. Text input 102 is received from one or more sources. For example, the text input 102 can be, but is not limited to, blog entries, comments, social media posts, call central logs, text conversations, etc. Once the text input 102 is received, if necessary it can be broken up into text units. For example, a web page with multiple comments about a product or multiple micro-blog entries can be broken up into individual comments or micro-blog entries. Other text input, such as a single blog post, is not required to be broken up into different text units. The text input 102 or text units derived from the text input 102 can then be converted into a common format, such as a multi-dimensional matrix 104. In one implementation, a tokenizer parses the text units into n-grams. For example, the tokenizer can parse individual words based upon spaces and punctuation marks from which the text unit is determined. The words from each text unit can then be used to generate the multi-dimensional matrix 104. In one implementation, the columns of the multi-dimensional matrix 104 are words and the rows represent a single unit. The values of the multi-dimensional matrix 104 are the number of times a word appears in the unit. In this implementation, the multi-dimensional matrix 104 can be called a term-frequency matrix.

The multi-dimensional matrix 104 can be produced in various other ways. For example, using single words from the text data does not take into consideration phrases, e.g., "cell phone," "social media," etc. In one implementation, phrases can be accounted for by looking at n-grams. For example, each word and every two-word phrase can be generated from the text units and used to generate the multi-dimensional matrix 104. In this example, n is equal to 2. Other values such as 3, 4, 5, etc., can also be used to generate the n-grams used to build the multi-dimensional matrix 104.

As another example, a named entity recognizer can be used to parse the text units. The named entity recognizer can identify entities contained within text. For example, names of people, companies, city names, state names, country names, etc., can be recognized. If the actual name of an entity is not relevant for deriving concepts from the text data, the actual name can be replaced with the entity name. For example, assuming that names of individuals are not useful, names can be replaced with the word "person." In another implementation, some names can be retained while others are replaced. For example, if one or more particular people might be useful but not others, the names of the one or more particular people can be kept in the text data while other names are replaced with "person."

The multi-dimensional matrix 104 is very likely to have an incredibly large number of dimensions, e.g., columns for each word used in all the text input, and be sparsely populated. The multi-dimensional matrix 104 is likely to be sparsely populated, since an average unit will only use a small fraction of all of the words from the text input. As described below, eventually the multi-dimensional matrix 104 will have its dimensionality significantly reduced, e.g., two or three dimensions. Prior to this reduction, however, the number of columns and/or rows can be slightly reduced in various ways. Slightly reduced here means that the dimensions of the multi-dimensional matrix 104 are reduced, but are not condensed down to a small number of dimensions, e.g., fewer than 10. As an example, to account for different verb endings or plural words, words can be stemmed prior to being placed into the multi-dimensional matrix 104. In this implementation, words like "using" and "used" would be treated as the same item within the multi-dimensional matrix 104. The number of columns within the multi-dimensional matrix 104 is therefore reduced.

Some words that are used often in a language but do not by themselves describe a topic being discussed can be removed entirely from the multi-dimensional matrix 104. These common or stop words can be filtered from the text units. In one implementation, the stemmed stop words are filtered from the stemmed words of the text units. A list of known stop words can be used to identify individual stop words. In another implementation, the stop words can be generated from the multi-dimensional matrix 104. Once the multi-dimensional matrix 104 is created, words that are present in more than a predetermined percentage of text units can be treated as stop words. For example, if a common search term is used to generate search results that make the text input, the common search term can be identified as a stop word. This is true even if the common search term is not a traditional stop word. As another example, any word that is contained within more than a predetermined number of text units, e.g., 60%, 50%, 25%, etc., can be identified as a stop word. The column or columns associated with the common search term can be removed from the multi-dimensional matrix 104. The list of known stop words can be used in conjunction with the determination of stop words from the multi-dimensional matrix 104.

Text units can also be identified and removed from the multi-dimensional matrix 104. For example, documents that do not have any word counts in any column. This can occur, for example, if the text unit only contains stop words. In addition, text units that do not contain any common words are likely to not be useful. For example, a text unit could be written in a foreign language compared to the majority of other text units, and therefore, not contain any stop words but would contain word counts within some columns of the multi-dimensional matrix 104. These text units can be removed as not having any stop words, e.g., having only non-stop words.

As an example of a multi-dimensional matrix, the text input 102 can include the following three text units: "I love my ACME Plus digital camera I just received"; "my digital camera just broke!"; and "I just bought an ACME plus digital camera." These text units could have been derived from a larger set of text data corresponding to recent product reviews of digital camera by searching the larger set of text data for reviews that included the term "digital camera" posted within the last week. One example of multi-dimensional matrix generated from three text units is:

|  | I | love | my | ACME | plus | digital | camera | just | received | broke | an | bought |
|---|---|---|---|---|---|---|---|---|---|---|---|---|
| Text Unit 1 | 2 | 1 | 1 | 1 | 1 | 1 | 1 | 1 | 1 | 0 | 0 | 0 |
| Text Unit 2 | 0 | 0 | 1 | 0 | 0 | 1 | 1 | 1 | 0 | 1 | 0 | 0 |
| Text Unit 3 | 1 | 0 | 0 | 1 | 1 | 1 | 1 | 1 | 0 | 0 | 1 | 1 |

In the above example, the multi-dimensional matrix is not sparsely populated with regard to text unit 1. As this is a limited example with only three text units, the rows within the multi-dimensional matrix will quickly become sparsely populated with the addition of more text units. This can already be seen in how sparsely populated text units 2 and 3 are. Assuming the list of known stop words includes "I," "my," and "an," the multi-dimensional matrix becomes the following once these stop words are removed:

|  | love | ACME | plus | digital | camera | just | received | broke | bought |
|---|---|---|---|---|---|---|---|---|---|
| Text Unit 1 | 1 | 1 | 1 | 1 | 1 | 1 | 1 | 0 | 0 |
| Text Unit 2 | 0 | 0 | 0 | 1 | 1 | 1 | 0 | 1 | 0 |
| Text Unit 3 | 0 | 1 | 1 | 1 | 1 | 1 | 0 | 0 | 1 |

In addition, the multi-dimensional matrix can be analyzed and the following stop words can be identified from the multi-dimensional matrix itself: "digital"; "camera"; and "just." In this limited example, these three words can be identified as stop words appearing in all three of the text units. The phrases "digital" and "camera" could be identified as stop words on the basis that the phrase "digital camera" was used to search a large set of text data to generate the relevant text data used to generate the multi-dimensional matrix. Removing these stop words results in the following multi-dimensional matrix:

|            | love | ACME | plus | received | broke | bought |
|------------|------|------|------|----------|-------|--------|
| Text Unit 1 | 1    | 1    | 1    | 1        | 0     | 0      |
| Text Unit 2 | 0    | 0    | 0    | 0        | 1     | 0      |
| Text Unit 3 | 0    | 1    | 1    | 0        | 0     | 1      |

As described in greater detail below, this multi-dimensional matrix can then be even further reduced to a two dimensional matrix.

Once the multi-dimensional matrix has been created, it can be normalized. In one implementation, a vector can be used to represent text in a text unit. For example, $\vec{X}$ can be a vector that represents a text unit based upon a set of words v that includes all of the unique words from all of the text units. The number of unique words can be represented by m. The number of elements of the vector $\vec{X}$ can be equal to the number of unique words m in the set v, with each element corresponding to one word in the set v. The value of each element of the vector $\vec{X}$ can equal the number of times that the corresponding unique word for that element is used in the text unit, which will be a number greater than or equal to zero. In this example, the vector $\vec{X}$ can be normalized using the formula:

$$\vec{X}_{norm} = \frac{\vec{X}}{\sqrt{\vec{X} \cdot \vec{X}}} = \frac{1}{\sum_{i=1}^{m} x_i^2}(x_1, x_2, \ldots x_m)$$

The normalized vectors can be used to compare similarity across multiple text units. As described below, the normalized multi-dimensional matrix can have the number of dimensions greatly reduced.

Even with any reduction in dimensionality based upon one or more of the features described above, the multi-dimensional matrix 104 will still have a large number of dimensions. In addition, the multi-dimensional matrix 104 will still be sparsely populated. Accordingly, the dimensionality of the multi-dimensional matrix 104 can be reduced 106, while preserving the similarities between text units. In one implementation, non-linear dimensionality reduction (NLDR) can be used to reduce the number of dimensions for each document to two. In one implementation, the similarity between documents in the multi-dimensional matrix 104 can be calculated as:

$$p_{ij} = \frac{\exp(-\|\vec{X}_i - \vec{X}_j\|/2\sigma)}{\sum_{k=1,k \neq l}^{N} \exp(-\|\vec{X}_k - \vec{X}_l\|/2\sigma)},$$

where $\vec{X}$ is the term frequency vector for a text unit, without any reduction, for a particular text unit. The distribution σ is an unknown value that is determined based upon the above formula. The distribution σ can be solved for using the following formula in conjunction with the above formulate for $p_{ij}$:

$$\text{Perplexity}(P_i) = 2^{-\sum_{j=1}^{N} p_{ji} \log_2 p_{ji}}.$$

Various values of σ can be solved for by setting the value of perplexity to a known value. For example, perplexity can be set to 10, 25, 30, 50, etc, and σ can be solved for. Once σ is determined, $p_{ij}$ can be determined by the above formula.

The two dimensional matrix for a text unit can be represented by $\vec{Y}$, which includes two coordinates (x,y) associated with the text unit. Initially, the (x,y) values for each text unit can be set to random values. From these initial vectors $\vec{Y}$, $q_{ij}$ can be calculated as:

$$q_{ij} = \frac{\left(1 + \|\vec{Y}_i - \vec{Y}_j\|^2\right)^{-1}}{\sum_{k=1,k \neq l}^{N} \left(1 + \|\vec{Y}_k - \vec{Y}_l\|^2\right)^{-1}}$$

The distribution $q_{ij}$ represents the similarity between two documents in the reduced dimension space, e.g., the two dimensional space. Because the $\vec{Y}$ vectors are initially set to random values, the values in the two dimensional space need to be modified based upon the similarities of the documents in the multi-dimensional matrix 104. This can be done by minimizing the divergence between $p_{ij}$ and $q_{ij}$. In one implementation, this is done by minimizing a cost function, such as, but not limited to:

$$C = KL(P\|Q) = \sum_{i=1}^{N} \sum_{j=1}^{N} p_{ij} \log \frac{p_{ij}}{q_{ij}}.$$

In one implementation, the cost function can be minimized by using a gradient descent. For example, the gradient descent of the above cost function C is:

$$\frac{\partial C}{\partial y_i} = 4 \sum_{j=1}^{N} (p_{ij} - q_{ij})(y_i - y_j)(1 + \|y_i - y_j\|^2)^{-1},$$

where y is the y-coordinate value of a text unit. The y-coordinate value of a text unit is updated iteratively based on the following:

$$y^{(t)} = y^{(t)} + \eta \frac{\partial C}{\partial y} + \alpha(y^{(t-1)} - y^{(t-2)}).$$

$y^{(t)}$ is the y value at iteration step t and is derived from the above cost function. A learning rate parameter η and a momentum value α are used to control how quickly y changes per iteration. Various values can for η and a can be used. For example, α can be 0.1, 0.25, 0.5, 0.6, etc., and η can be 100, 200, 250, 500, etc. Changes to the y-coordinates continue until a iteration termination condition is met. In one implementation, this condition can be:

$$\frac{|\Delta C^t|}{C^t} = \frac{C^t - C^{t-1}}{C^t} \leq \delta,$$

where $C^t$ is the cost function at iteration step t. The value of δ can be various values, such as, but not limited to, 0.02, 0.04, 0.08, 0.10, etc. The same calculations as those above can be used for determining the x-coordinates for the text units. Once this is done, the vectors $\vec{Y}$ include a (x,y) coordinate for each text unit such that the similarity between $\vec{X}$ and $\vec{Y}$ has been maintained. Accordingly, the number of columns in the multi-dimensional matrix 104 is reduced to two. After the dimensional reduction, each text unit is associated with an (x,y) coordinate. The coordinates of the various text units are such that the divergence between the multi-dimensional matrix 104 and the reduced dimensional matrix is reduced. In other implementations, other numbers of dimensions can also be used, for example, three, where each document is associated with an (x,y,z) coordinate.

Clustering 108 of the resulting reduced-dimensional matrix can be performed. In one implementation, the number of clusters and the minimum size of a cluster are dynamic. For example, these parameters can be set to initial default values, but can be changed based upon user input. In one implementation, clusters can be defined using a density-based spatial clustering of applications with a noise filter. In other implementations, other arbitrary shaped cluster determining algorithms can be used.

Figure 2A:
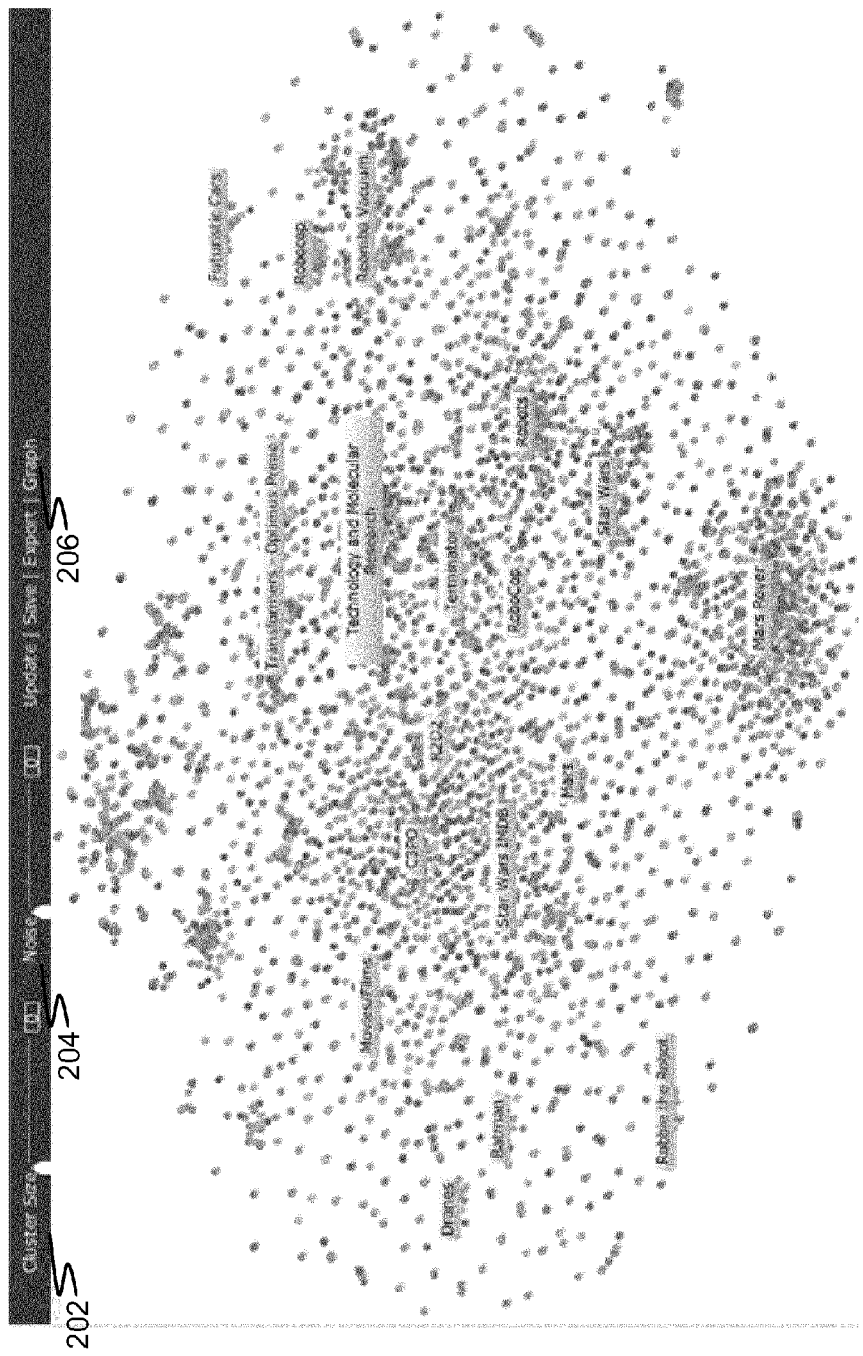
FIGS. 2A-2E illustrate cluster visualization in accordance with an illustrative embodiment.

Once the clusters have been defined, they can be visualized 110. For example, a map illustrating the clusters can be provided. FIGS. 2A-2E illustrate cluster visualization in accordance with an illustrative embodiment. FIG. 2A illustrates all the text units returned as a part of a search that is used to build the initial text input. A cluster input 202 allows the size of a cluster to be defined. In FIG. 2A, each dot represents one or more text units from the text input that belongs to its own cluster since the cluster size is 0. Different clusters can be identified from one another by color. In addition, each point can be selected. Upon selection of a point, information about the text unit can be provided. In one implementation, the keywords from the text unit are supplied. The full text of the text unit can also be provided.

Figure 2B:
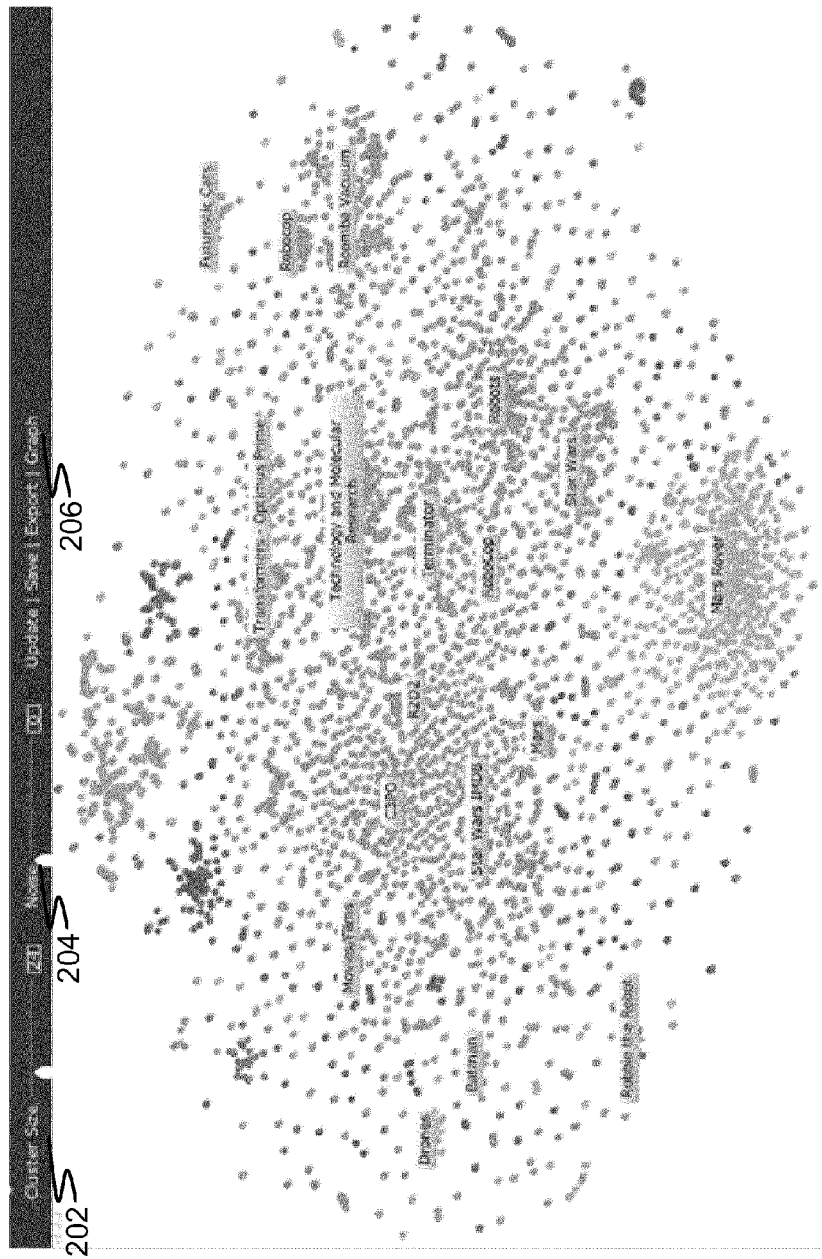

FIG. 2B illustrates the same text units as shown in FIG. 2A, but with a cluster size of 24. In one implementation, the cluster size is the minimum number of related items needed to create a cluster. For example, in FIG. 2A there needs to be 24 related text units for those 24 text units to form a cluster. Of course, clusters can include more than the minimum number of text units. The cluster size can be a parameter to a density-based spatial clustering algorithm that allows the size of a cluster to vary. Similar to FIG. 2A, FIG. 2B contains all of the text units that were analyzed. The node, however, can be clustered together with other nodes. In addition to identifying the clusters, the clusters can be labeled based upon the text units within each cluster. In one implementation, latent Dirichlet allocation (LDA) can be used to define labels from the clusters. In another implementation, the n-grams appearing the most often within the text units can be provided as the cluster label. In yet another implementation, LDA and n-grams can be combined to determine cluster labels. LDA attempts to identify sets of words based on their togetherness throughout the text units; that is, words that commonly occur near one another not based upon how many times the words appear throughout the text units. In one implementation, the text labels are derived from the text units independently of the clustering. Accordingly, a cluster can have one or more text labels that are associated with the node.

Upon selection of a node, a cluster or one of the text labels, various information about the cluster can be accessed. For example, each text unit that makes up the node can be accessed. Other data items generated from the text units of a cluster that can be accessed can include words clouds, originating sites, the type of text units, word groupings, sentiment, and trend lines over time.

Figure 2C:
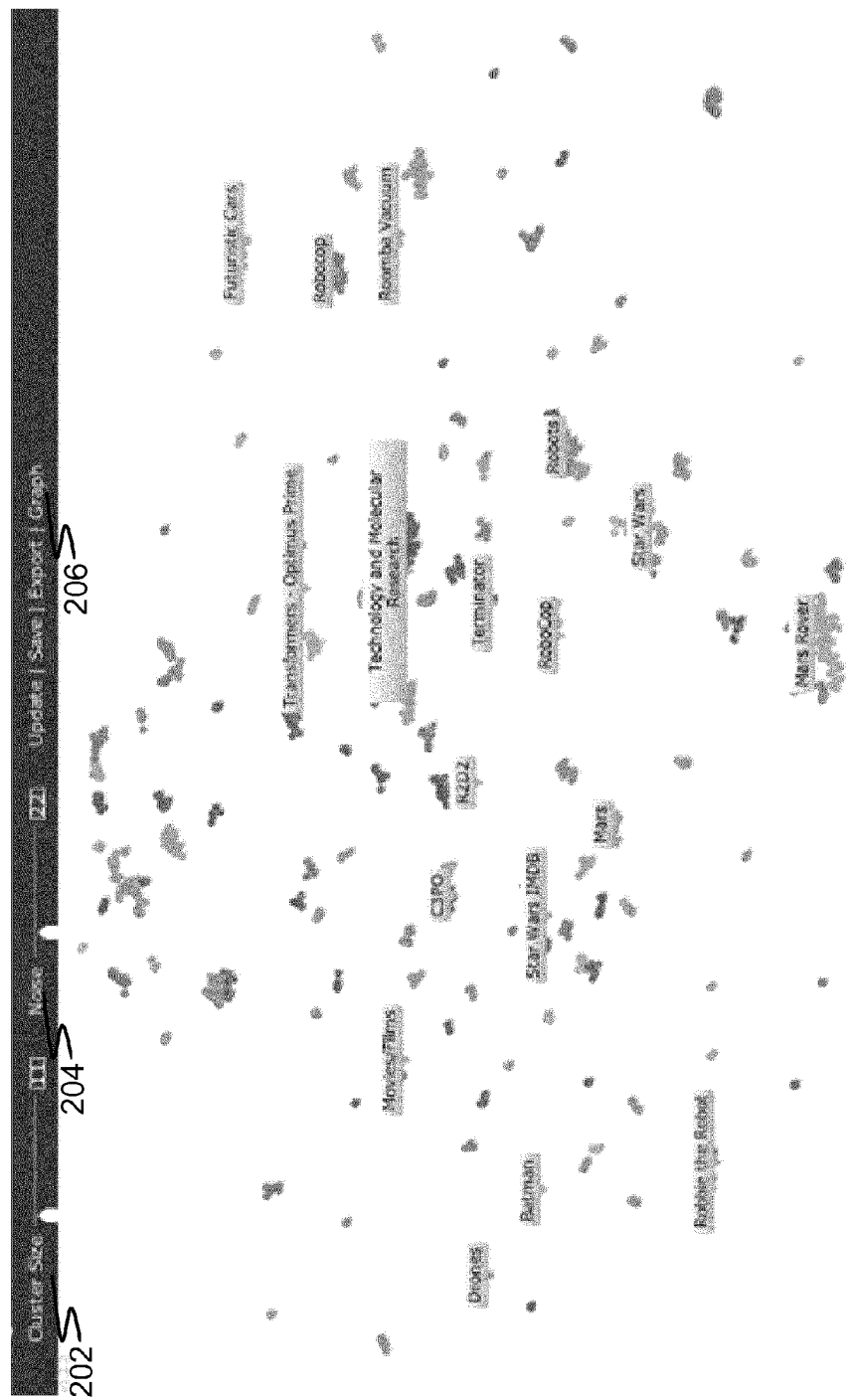
Figure 2D:
Figure 2E:
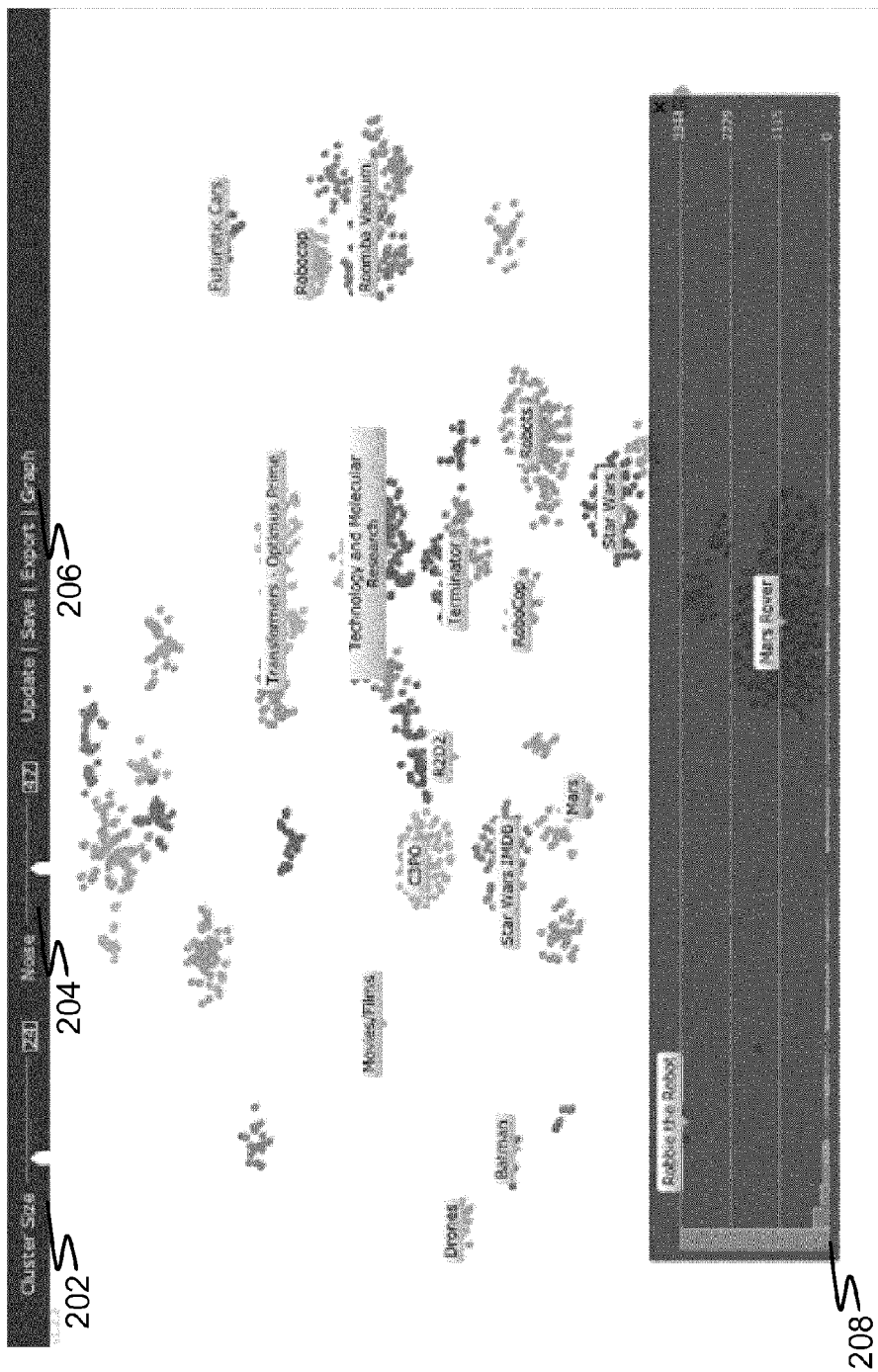

Another parameter that can be specified for the clustering algorithm is a noise parameter. The noise parameter can be used to filter text units that are not near a cluster. FIG. 2C illustrates the same text units as shown in FIG. 2A, but with a noise filter enabled. A noise filter input 204 allows the setting and/or changing the noise filter parameter. Accordingly, some of the nodes have been removed from the graph in FIG. 2C. The cluster size parameter and the noise filter can be used in combination. FIG. 2D illustrates the same text units as shown in FIG. 2A, but with both a cluster size of 24 and a noise filter enabled. In FIG. 2D, various clusters are shown with only a few isolated points. In one implementation, a graph illustrating the number of text units per cluster can be viewed. FIG. 2E illustrates the text unit cluster count for the clusters shown in FIG. 2D. The graph 208 can be viewed by selecting a graph user interface component 206. Other user interface components allow for interacting with the illustrated text units. For example, the text unit data can be exported or saved. The criteria for selecting text units can also be updated to change the text units that are graphed.

In one implementation, the location of the clusters within the map is essentially random. That is, if the same text data is used, the same clusters will be identified, but the position of the clusters within the map could change. In another implementation, a conditional probability between various clusters is determined. In one implementation, the conditional probability can be determined based upon the centroids of the clusters. A centroid for each of K clusters can be calculated as:

$$c_i = \frac{1}{K} \sum_{k=1}^{K} \vec{Y_k}.$$

The condition probability between two clusters, that is, the probability of observing cluster $c_j$ given cluster $c_i$ is calculated as:

$$p(c_i, c_j) = \frac{\left(1 + \|\vec{c_i} - \vec{c_j}\|^2\right)^{-1}}{\sum_{k=1, k \neq l}^{N} \left(1 + \|\vec{c_i} - \vec{c_k}\|^2\right)^{-1}}.$$

Using the conditional probability, clusters can be placed close to other clusters that are likely to be observed together. For example, assuming clusters include only a single text unit, a cluster can be related to another cluster. In this example, the text unit is artificially constrained to a single cluster, but may contain text related to two or more different clusters. To illustrate clusters that contain text units that are related to one another, e.g., the text units contain text related to both clusters, the conditional probability of two clusters can be used to determine a distance between two clusters. For example, assume that text units related to a product are placed into the following four clusters: "positive reviews"; "broken features"; "returns"; and "negative reviews." The clusters "broken features," "returns," and "negative reviews" can be located near one another based on the text units. To determine this distance, the conditional probability of each text unit of a particular cluster relating to each of the other clusters can be determined. This can be repeated for each cluster as needed. These calculations can show that if a text unit is clustered as a "broken features" item there is a relatively large probability that the text unit is also related to the "returns" cluster. Further, probability that a text unit in the "broken features" cluster is also related to the "positive reviews" cluster is small. Accordingly, the "broken features" cluster can be located near the "returns" cluster in the map and further away from the "positive reviews" cluster. The conditional probability between each pair of clusters can be determined and used to position the clusters relatively within the map. In other implementations, the conditional probability can be calculated as the probability of a text unit being related to three or more clusters.

In another implementation, prior to significantly reducing the dimensions, the multi-dimensional matrix 104 can be compressed. For example, the text units that make up the multi-dimensional matrix 104 can be clustered. In one implementation, the text units are clustered using k-means. After this clustering, the number of columns within the multi-dimensional matrix 104 will be the same, but the number of rows will be reduced. In this implementation, an individual row no longer represents a single text unit, but rather a cluster of text units. The clustered multi-dimensional matrix can then have its dimensionality reduced using weighted nonlinear dimensionality reduction. After the clustering of the multi-dimensional matrix, similarity between two clusters in the multi-dimensional matrix can be calculated as:

$$p_{ij} = \frac{\exp(-\|\vec{Z}_i - \vec{Z}_j\|/2w_i\sigma)}{\sum_{k=1,k\neq l}^{L} \exp(-\|\vec{Z}_k - \vec{Z}_l\|/2w_i\sigma)}$$

Where $\vec{Z}_i$ is a centroid and $w_i$ is a weight value associated with cluster i. σ is a distribution and can be calculated based upon the perplexity formula described above. Using the number of clusters K from the clustering of the multi-dimensional matrix, the centroid can be calculated as:

$$Z_i = \frac{1}{K}\sum_{k=1}^{K} \vec{X_k}.$$

The $w_i$ is a weight of the distribution a that takes into account the cluster size. Accordingly, the similarity between two clusters in the multi-dimensional matrix takes into account the size of the clusters. In one implementation, the weight for a cluster is equal to the size of the cluster. Other weight values can be used. For example, a weight value of two times the size of the cluster or the size of the cluster squared can be used. Using larger weight values results in larger clusters having more influence on the distribution $p_{ij}$.

As described above, the two dimensional matrix for a text unit can be represented by $\vec{Y}$, which includes two coordinates (x,y) associated with the text unit. Initially, the (x,y) values for each text unit can be set to random values. From these initial vectors $\vec{Y}$, $q_{ij}$ can be calculated as:

$$q_{ij} = \frac{\left(1+\|\vec{Y}_i - \vec{Y}_j\|^2\right)^{-1}}{\sum_{k=1,k\neq l}^{N}\left(1+\|\vec{Y}_k - \vec{Y}_l\|^2\right)^{-1}}$$

As described in detail above, a cost function can be minimized to determine the $\vec{Y}$ for each document. Thereby, reducing the number of dimensions down to two while maintaining similarity between the high-dimensional matrix and the reduced dimensional matrix.

Figure 3:
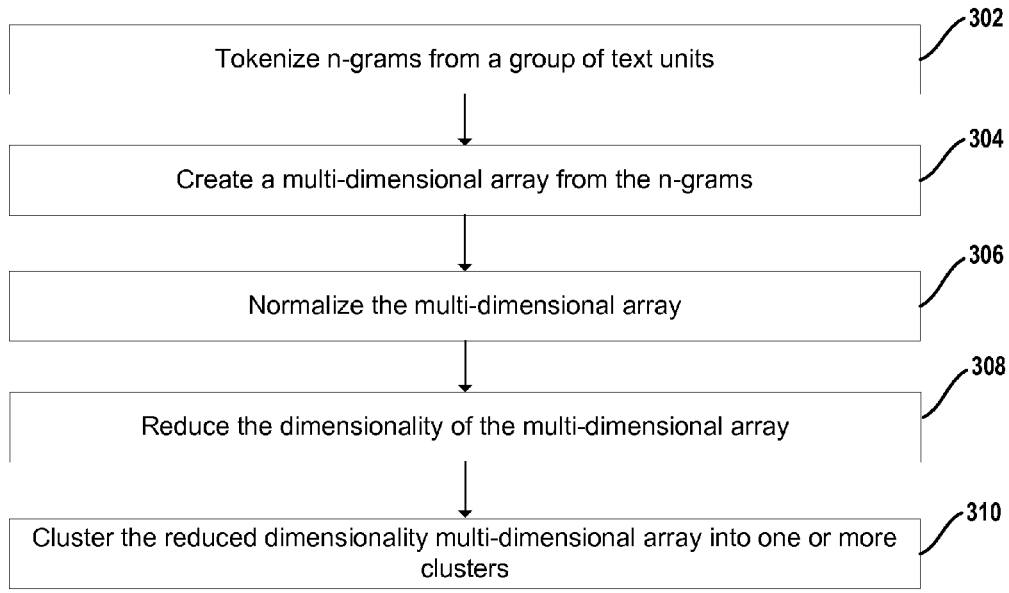
FIG. 3 is a flow diagram of operations of a method for clustering a group of text units in accordance with an illustrative embodiment.

FIG. 3 is a flow diagram of operations of a method 300 for clustering a group of text units in accordance with an illustrative embodiment. Additional, fewer, or different operations of the method 300 may be performed, depending on the particular embodiment. The method 300 can be implemented on a computing device. In one implementation, the method 300 is encoded on a computer-readable medium that contains instructions that, when executed by a computing device, cause the computing device to perform operations of the method 300.

As described above, text units can be generated from various sources, e.g., social media postings, comments, reviews, etc. The text units are tokenized into n-grams (302). For example, unigrams, bigrams, or trigrams can be generated from the text units. The n-grams are used to construct a multi-dimensional array (304). In one implementation, the rows of the multi-dimensional array correspond with individual text units and the columns correspond with individual n-grams. The multi-dimensional array is normalized (306). For example, the multi-dimensional array can be normalized to account for varying sizes of the text units. The dimensionality of the multi-dimensional array is very likely to be incredibly large. As described in greater detail above, the dimensionality of the multi-dimensional array can be greatly reduced (308). For example, the number of columns can be reduced down to two or three. Once the dimensionality has been reduced, the multi-dimensional array can be clustered into one or more clusters (310). Labels for the clusters can also be derived from the text units that are included in each cluster. In one implementation, the text units that make up each cluster can be provided graphically on a map.

Figure 4:
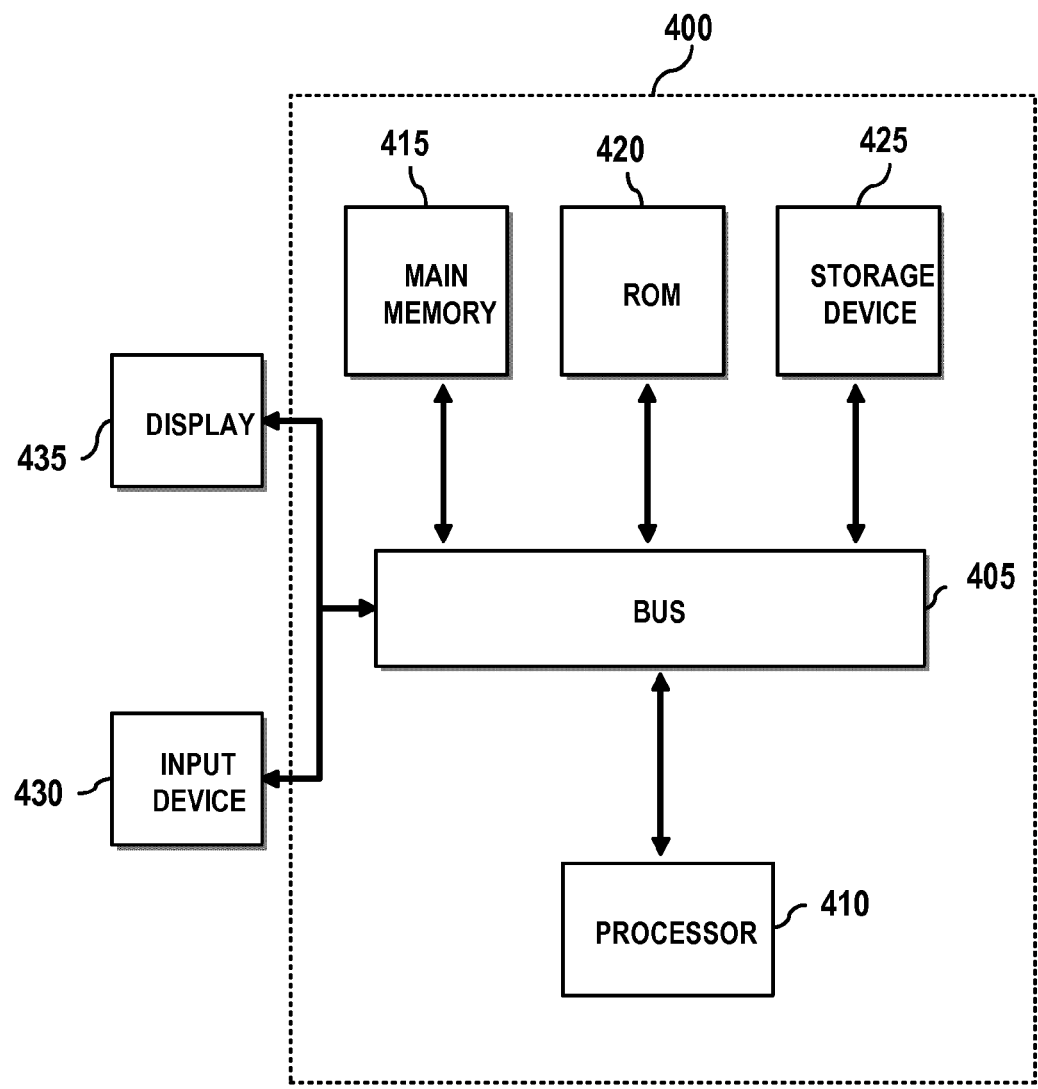
FIG. 4 is a block diagram of a computing device.

FIG. 4 is a block diagram of a computer system in accordance with an illustrative implementation. The computing system 400 includes a bus 405 or other communication component for communicating information and a processor 410 or processing circuit coupled to the bus 405 for processing information. The computing system 400 can also include one or more processors 410 or processing circuits coupled to the bus 405 for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. In another implementation, the input device 430 has a touch screen display 435. The input device 430 can include a cursor control, such as a mouse, a trackball, or cursor direction keys, for communicating direction information and command selections to the processor 410 and for controlling cursor movement on the display 435.

According to various implementations, the processes described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Implementations described in this specification can be implemented in digital electronic circuitry, or in computer software, firmware, or hardware, including the structures disclosed in this specification and their structural equivalents, or in combinations of one or more of them. The implementations described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is both tangible and non-transitory.

Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. Thus, particular implementations have been described.

We claim:

1. A method comprising operations executed on a processor, the operations comprising:
tokenizing a plurality of text units from a plurality of documents;
creating a first multi-dimensional array, wherein the dimensions of the first multi-dimensional array are based upon the plurality of text units;
normalizing the first multi-dimensional array;
reducing the dimensionality of the first multi-dimensional array;
creating a second multi-dimensional array for each of the text units, wherein each text unit is initially assigned a random x-coordinate and a random y-coordinate;
determining a first distribution based on similarity of each document with each other document in the plurality of text units using the first multi-dimensional array;
determining a second distribution based on similarity of each document with each other document in the plurality of text units using the second multi-dimensional array based upon the x-coordinates and y-coordinates;
minimizing divergence between the first distribution and the second distribution by iterating a cost function:

$$C = KL(P\|Q) = \sum_{i=1}^{N}\sum_{j=1}^{N} p_{ij} \log \frac{p_{ij}}{q_{ij}},$$

where $p_{ij}$ is the similarity between two text units in the first distribution, $q_{ij}$ is the similarity between two text units in the second distribution, wherein each iteration updates at least the x-coordinate or y-coordinate in the second multi-dimensional array; and
clustering the second multi-dimensional array to generate a plurality of clusters, wherein each cluster comprises one or more of the plurality of text units.

2. The method of claim 1, further comprising determining a label for each of the clusters based on the one or more of the plurality of text units of the cluster.

3. The method of claim 2, further comprising producing a visual graph of the plurality of clusters that includes an indication of each of the plurality of text units, wherein each indication is colored based upon the cluster of the text unit.

4. The method of claim 3, further comprising:
determining a conditional probability that a text unit of a first cluster is related to a second cluster; and
determining a distance between the text units of the first cluster and the text units of the second cluster in the visual graph based upon the determined conditional probability.

5. The method of claim 1, wherein the text units are tokenized into unigrams.

6. The method of claim 1, wherein the text units are tokenized into bigrams.

7. The method of claim 1, further comprising:
determining one or more words from the first multi-dimensional array that are in a predetermined number of text units; and
removing entries from the first multi-dimensional array corresponding to the one or more words.

8. The method of claim 1, further comprising:
removing stop words from the text units;
determining one or more documents text units that do not contain any stop words; and
removing one or more text units from the one or more documents that do not contain any stop words from the first multi-dimensional array.

9. The method of claim 1, wherein the x-coordinate is updated iteratively based on $$x^{(t)} = x^{(t)} + \eta \frac{\partial C}{\partial x} + \alpha(x^{(t-1)} - x^{(t-2)}),$$

where t represents an iteration, $\eta$ is a learning rate parameter, and $\alpha$ is a momentum value.

10. The method of claim 1, wherein the y-coordinate is updated iteratively based on $$y^{(t)} = y^{(t)} + \eta \frac{\partial C}{\partial y} + \alpha(= y^{(t-1)} - y^{(t-2)}),$$

where t represents an iteration, η is a learning rate parameter, and α is a momentum value.

11. The method of claim 1, wherein $p_{ij}$ is calculated as $$p_{ij} = \frac{\exp(-\|\vec{X}_i - \vec{X}_j\|/2\sigma)}{\sum_{k=1,k\neq l}^{N} \exp(-\|\vec{X}_k - \vec{X}_l\|/2\sigma)}$$

where $\vec{X}$ is a term frequency vector for a text unit for a particular text unit, and σ is a distribution calculated based upon $p_{ij}$ and perplexity $$(P_i) = 2^{-\sum_{j=1}^{N} p_{ij} \log_2 p_{ji}},$$

where perplexity is set to a predetermined value.

12. The method of claim 11, wherein $q_{ij}$ is calculated as $$q_{ij} = \frac{\left(1 + \|\vec{Y}_i - \vec{Y}_j\|^2\right)^{-1}}{\sum_{k=1,k\neq l}^{N} \left(1 + \|\vec{Y}_k - \vec{Y}_l\|^2\right)^{-1}}$$

where $\vec{Y}$ is a vector that includes the x-coordinate and the y-coordinate.

13. The method of claim 1, wherein the second multi-dimensional array consists of two dimensions: the x-coordinate and the y-coordinate.

14. The method of claim 1, wherein the second multi-dimensional array consists of three dimensions: the x-coordinate, the y-coordinate, and a z-coordinate.

15. A non-transitory computer-readable medium, having instructions stored thereon that when executed by a computing device cause the computing device to perform operations comprising:
tokenizing a plurality of text units from a plurality of documents;
creating a first multi-dimensional array, wherein the dimensions of the first multi-dimensional array are based upon the plurality of text units;
normalizing the first multi-dimensional array;
reducing the dimensionality of the first multi-dimensional array;
creating a second multi-dimensional array for each of the text units, wherein each text unit is initially assigned a random x-coordinate and a random y-coordinate;
determining a first distribution based on similarity of each document with each other document in the plurality of text units using the first multi-dimensional array;
determining a second distribution based on similarity of each document with each other document in the plurality of text units using the second multi-dimensional array based upon the x-coordinates and y-coordinates;
minimizing divergence between the first distribution and the second distribution by iterating a cost function:

$$C = KL(P\|Q) = \sum_{i=1}^{N} \sum_{j=1}^{N} p_{ij} \log \frac{p_{ij}}{q_{ij}},$$

where $p_{ij}$ is the similarity between two text units in the first distribution, $q_{ij}$ is the similarity between two text units in the second distribution, wherein each iteration updates at least the x-coordinate or y-coordinate in the second multi-dimensional array; and
clustering the second multi-dimensional array to generate a plurality of clusters, wherein each cluster comprises one or more of the plurality of text units.

16. The non-transitory computer-readable medium of claim 15, wherein the operations further comprise determining a label for each of the clusters based on the one or more of the plurality of text units of the cluster.

17. The non-transitory computer-readable medium of claim 16, wherein the operations further comprise:
producing a visual graph of the plurality of clusters that includes an indication of each of the plurality of text units, wherein each indication is colored based upon the cluster of the text unit;
determining a conditional probability that a text unit of a first cluster is related to a second cluster; and
determining a distance between the text units of the first cluster and the text units of the second cluster in the visual graph based upon the determined conditional probability.

18. A system comprising:
one or more electronic processors configured to:
tokenize a plurality of text units from a plurality of documents;
create a first multi-dimensional array, wherein the dimensions of the first multi-dimensional array are based upon the plurality of text units;
normalize the first multi-dimensional array;
reduce the dimensionality of the first multi-dimensional array;
create a second multi-dimensional array for each of the text units, wherein each text unit is initially assigned a random x-coordinate and a random y-coordinate;
determine a first distribution based on similarity of each document with each other document in the plurality of text units using the first multi-dimensional array;
determine a second distribution based on similarity of each document with each other document in the plurality of text units using the second multi-dimensional array based upon the x-coordinates and y-coordinates;
minimize divergence between the first distribution and the second distribution by iterating a cost function:

$$C = KL(P\|Q) = \sum_{i=1}^{N} \sum_{j=1}^{N} p_{ij} \log \frac{p_{ij}}{q_{ij}},$$

where $p_{ij}$ is the similarity between two text units in the first distribution, $q_{ij}$ is the similarity between two text units in the second distribution, wherein each iteration updates at least the x-coordinate or y-coordinate in the second multi-dimensional array; and cluster the second multi-dimensional array to generate a plurality of clusters, wherein each cluster comprises one or more of the plurality of text units.

19. The system of claim 18, wherein the one or more electronic processors are further configured to determine a label for each of the clusters based on the one or more of the plurality of text units of the cluster.

20. The system of claim 19, wherein the one or more electronic processors are further configured to:

produce a visual graph of the plurality of clusters that includes an indication of each of the plurality of text units, wherein each indication is colored based upon the cluster of the text unit;

determine a conditional probability that a text unit of a first cluster is related to a second cluster; and determine a distance between the text units of the first cluster and the text units of the second cluster in the visual graph based upon the determined conditional probability.

* * * * *

UNITED STATES PATENT AND TRADEMARK OFFICE
CERTIFICATE OF CORRECTION

PATENT NO.        : 9,141,882 B1
APPLICATION NO.   : 13/656315
DATED             : September 22, 2015
INVENTOR(S)       : Baoqiang Cao et al.

Page 1 of 1

It is certified that error appears in the above-identified patent and that said Letters Patent is hereby corrected as shown below:

In the claims

Claim 8, Column 12, line 54, "text units" should be deleted.

Signed and Sealed this
Twenty-third Day of February, 2016

Michelle K. Lee
*Director of the United States Patent and Trademark Office*